(12) United States Patent
Metakar et al.

(10) Patent No.: US 12,508,143 B2
(45) Date of Patent: Dec. 30, 2025

(54) SMART KNEE BRACE (71) Applicant: Hippos Exoskeleton, Inc., Dover, DE (US)

(72) Inventors: Bhavy Metakar, Southend-on-Sea (GB); Jinglin Xiao, London (GB)

(73) Assignee: Hippos Exoskeleton, Inc., Dover, DE (US)

( * ) Notice: Subject to any disclaimer, the term of this patent is extended or adjusted under 35 U.S.C. 154(b) by 0 days.

(21) Appl. No.: 19/172,601

(22) Filed: Apr. 7, 2025

(65) Prior Publication Data

US 2025/0312180 A1    Oct. 9, 2025

Related U.S. Application Data

(60) Provisional application No. 63/631,122, filed on Apr. 8, 2024, provisional application No. 63/702,190, filed on Oct. 2, 2024.

(51) Int. Cl.
*A61F 5/01* (2006.01)
*A61B 5/00* (2006.01)
*A61B 5/11* (2006.01)

(52) U.S. Cl.
CPC ............ *A61F 5/012* (2013.01); *A61B 5/1121* (2013.01); *A61B 5/6812* (2013.01); *A61F 5/0106* (2013.01); *A61F 5/0109* (2013.01); *A61B 5/1126* (2013.01)

(58) Field of Classification Search
CPC ..... A61B 5/112; A61B 5/1121; A61B 5/1122; A61B 5/6812; A61B 5/6828; A61F 5/0106; A61F 5/0109; A61F 5/012; A61F 2005/0158; A61F 2005/0165; A61F 2005/0181

See application file for complete search history.

(56) References Cited

U.S. PATENT DOCUMENTS

| | | | |
|---|---|---|---|
| 5,133,341 | A | 7/1992 | Singer et al. |
| 5,558,627 | A | 9/1996 | Singer et al. |
| 5,792,084 | A | 8/1998 | Wilson et al. |
| 8,679,042 | B2 | 3/2014 | Kausek |

(Continued)

OTHER PUBLICATIONS

International Search Report and Written Opinion issued in Int'l Patent Application No. PCT/US2025/023513 dated May 30, 2025, 12 pages.

*Primary Examiner* — Keri J Nelson
(74) *Attorney, Agent, or Firm* — MCANDREWS, HELD & MALLOY, LTD.

(57) ABSTRACT

The present disclosure provides a knee brace for preventing or mitigating injury to a user's knee. The knee brace includes a first sensor positioned with respect to a femur, and a second sensor positioned with respect to a tibia. The knee brace further includes a stiffening component configured to stabilize the user's knee, and a processor that receives sensor data from the first sensor and the second sensor to determine a relative position between the femur location and the tibia location. The processor is configured to activate the stiffening component when the relative position exceeds at least one of a first threshold, a second threshold, and a third threshold, wherein the first threshold indicates a potential over-rotation, wherein the second threshold indicates a potential over-abduction, and wherein the third threshold indicates a potential hyperextension.

20 Claims, 8 Drawing Sheets

(56) References Cited

U.S. PATENT DOCUMENTS

| | | |
|---|---|---|
| 2009/0024062 A1 | 1/2009 | Einarsson |
| 2016/0249829 A1* | 9/2016 | Trabia .................. A61B 5/7246 600/592 |
| 2021/0393427 A1* | 12/2021 | Mirza .................. A61B 5/6812 |
| 2023/0055998 A1 | 2/2023 | Park et al. |
| 2024/0024145 A1 | 1/2024 | Johnson et al. |
| 2024/0057697 A1 | 2/2024 | Young et al. |

* cited by examiner

SMART KNEE BRACE

CROSS REFERENCE

The present application claims the benefit under 35 U.S.C. § 119 of U.S. Prov. No. 63/631,122 filed Apr. 8, 2024, and titled "Smart Knee Device with Real-Time Injury Prevention Capabilities," and U.S. Prov. No. 63/702,190 filed Oct. 2, 2024, and titled "Smart Adaptive Knee to Prevent Knee Injuries." The disclosure of both applications are expressly incorporated herein by reference in their entireties for all purposes.

FIELD

The present disclosure is generally directed to a knee brace for reducing the chance of injury to a user's knee and, more particularly, to apparatuses and methods to prevent and mitigate knee injuries.

BACKGROUND

Knee injuries are common in sports, and a severe knee injury could result in surgical reconstruction and months of rehabilitation. A severe knee injury can be caused by undue relative displacement between the femur and tibia. Three types of relative displacement between the femur and tibia are: 1) over-rotation of the tibia with respect to the femur (hereinafter, "over-rotation"); 2) over-abduction of the tibia with respect to the femur (hereinafter, "over-abduction"); and 3) hyperextension of the tibia with respect to the femur (hereinafter, "hyperextension"). Over-rotation can occur when the tibia exceeds its anatomical ability to rotate along the femur's longitudinal axis. Over-abduction can occur when the knee moves inward toward the midline of the body with the lower leg shifting, or remaining, outward. Hyperextension can occur when the knee joint is bent in the posterior direction, beyond the usual limit of the knee, where the vertical alignment of the femur and tibia creates a concave orientation.

Any of the three relative displacements may cause serious injury, for example, by spraining or tearing one or more of the four knee ligaments: the anterior cruciate ligament ("ACL"), the posterior cruciate ligament ("PCL"), the medial collateral ligament ("MCL"), or the lateral collateral ligament ("LCL"). Among these types of injuries, ACL injuries are most common. Indeed, in some professional sports, such as football (American or soccer), ACL injuries are quite common and can occur many times per season. Although some professional athletes may be able to return to play following an ACL injury, many fail to return to their prior performance level. Thus, a knee brace capable of preventing or mitigating knee injuries is therefore needed.

SUMMARY

The present disclosure provides a smart knee brace for preventing or reducing injury to a user's knee, as illustrated by and described in connection with the figures of the present disclosure, and as set forth in the claims. Generally, the smart knee brace includes multiple sensors designed to measure the relative displacement between, or relative position of, the femur and tibia in multiple dimensions. When the measurements exceed one or more thresholds, a stiffening component is activated and provides support to the knee to counteract the injurious movement, thereby helping to prevent or mitigate injury.

In a first aspect, a knee brace for preventing or mitigating injury to a user's knee is provided. The knee brace includes a first sensor configured to be positioned to maintain a substantially constant positional relationship with respect to a location on a femur, and a second sensor configured to be positioned to maintain a substantially constant positional relationship with respect to a location on a tibia. The knee brace further includes a stiffening component configured to stabilize the user's knee. The knee brace further includes a processor configured to receive sensor data from the first sensor and the second sensor and to determine a relative position between the location on the femur and the location on the tibia based at least in part on the sensor data, wherein the processor is configured to activate the stiffening component when the relative position exceeds at least one of a first threshold, a second threshold, or a third threshold, and wherein the first threshold indicates a potential over-rotation of the tibia with respect to the femur, wherein the second threshold indicates a potential over-abduction of the tibia with respect to the femur, and wherein the third threshold indicates a potential hyperextension of the tibia with respect to the femur.

In an embodiment of the first aspect, each of the first sensor and the second sensor comprises a respective inertial measurement unit.

In an embodiment of the first aspect, the knee brace further includes a first electromagnet configured to generate one or more first magnetic pulses, a first magnetic sensor located proximate to the first electromagnet, wherein the first magnetic sensor is configured to detect the one or more first magnetic pulses and to generate data indicative of the one or more first magnetic pulses in response to the detection, a second electromagnet configured to generate one or more second magnetic pulses, and a second magnetic sensor located proximate to the second electromagnet, wherein the second magnetic sensor is configured to detect the one or more second magnetic pulses and to generate data indicative of the one or more second magnetic pulses in response to the detection, wherein the data indicative of the one or more first magnetic pulses and the data indicative of the one or more second magnetic pulses is received by the processor, and wherein the processor utilizes the data indicative of the one or more first magnetic pulses and the data indicative of the one or more second magnetic pulses to synchronize the sensor data from the first sensor and the second sensor.

In an embodiment of the first aspect, the stiffening component comprises a gas-inflatable chamber.

In an embodiment of the first aspect, when the processor activates the stiffening component, a gas is injected into the gas inflatable chamber via a gas cartridge.

In an embodiment of the first aspect, the sensor data from each of the first sensor and the second sensor comprises data relating to acceleration and angular velocity in three dimensions.

In an embodiment of the first aspect, the first sensor includes a first plurality of sensors and the second sensor includes a second plurality of sensors, wherein an arrangement of the first plurality of sensors and the second plurality of sensors is configured to reduce an effect of drift among the sensor data.

In an embodiment of the first aspect, the first sensor, the second sensor, and the processor are retained in a flexible housing.

In an embodiment of the first aspect, the knee brace further comprises at least one piezoelectric sensor, wherein the processor is further configured to receive data from the at least one piezoelectric sensor to determine whether to activate the stiffening component.

In an embodiment of the first aspect, the knee brace further comprises at least one stress sensor, wherein the processor is further configured to receive data from the at least one stress sensor to determine whether to activate the stiffening component.

In a second aspect, a knee brace for preventing or mitigating injury to a user's knee is provided. The knee brace includes a first sensor configured to be positioned to maintain a substantially constant positional relationship with respect to a location on a femur, and a second sensor configured to be positioned to maintain a substantially constant positional relationship with respect to a location on a tibia. The knee brace further includes a stiffening component configured to stabilize the user's knee. The knee brace further includes a processor configured to receive sensor data from the first sensor and the second sensor, wherein the processor is configured to inference a machine learning model to determine whether to activate the stiffening component based at least in part on the sensor data received from the first sensor and the second sensor.

In an embodiment of the second aspect, each of the first sensor and the second sensor comprises a respective inertial measurement unit.

In an embodiment of the second aspect, the knee brace further includes a first electromagnet configured to generate one or more first magnetic pulses, a first magnetic sensor located proximate to the first electromagnet, wherein the first magnetic sensor is configured to detect the one or more first magnetic pulses and to generate data indicative of the one or more first magnetic pulses in response to the detection, a second electromagnet configured to generate one or more second magnetic pulses, and a second magnetic sensor located proximate to the second electromagnet, wherein the second magnetic sensor is configured to detect the one or more second magnetic pulses and to generate data indicative of the one or more second magnetic pulses in response to the detection, wherein the data indicative of the one or more first magnetic pulses and the data indicative of the one or more second magnetic pulses is received by the processor, and wherein the machine learning model utilizes the data indicative of the one or more first magnetic pulses and the data indicative of the one or more second magnetic pulses in determining whether to activate the stiffening component.

In an embodiment of the second aspect, the stiffening component comprises a gas-inflatable chamber.

In an embodiment of the second aspect, when the stiffening component is activated, a gas is injected into the gas inflatable chamber via a gas cartridge.

In a third aspect, a method for preventing or mitigating injury to a user's knee is provided. The method includes determining a relative position between a location on a femur according to a first sensor and a location on a tibia according to a second sensor, and activating a stiffening component to stabilize the user's knee when the relative position exceeds at least one of a first threshold, a second threshold, and a third threshold, wherein the first threshold indicates a potential over-rotation of the tibia with respect to the femur, wherein the second threshold indicates a potential over-abduction of the tibia with respect to the femur, and wherein the third threshold indicates a potential hyperextension of the tibia with respect to the femur.

In an embodiment of the third aspect, the determining step and the activating step are performed at least partially by a processor.

In an embodiment of the third aspect, the processor is configured to receive sensor data from the first sensor and the second sensor, wherein the sensor data is indicative of a relative position between the first sensor and the second sensor.

In an embodiment of the third aspect, the stiffening component comprises a gas-inflatable chamber.

In an embodiment of the third aspect, the activating step further comprises injecting gas into the gas-inflatable chamber via a gas cartridge.

DRAWINGS

The foregoing and other objects, features, and advantages of the systems and methods described herein will be apparent from the following description of particular embodiments thereof, as illustrated in the accompanying figures, where like reference numbers refer to like structures. The figures are not necessarily to scale, emphasis instead being placed upon illustrating the principles of the systems and methods described herein.

FIG. 4 is a perspective view of the gas cartridge of FIG. 2 and the gas connector of

FIG. 3.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms unless otherwise stated or clear from context.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or "the like") provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage or mode of operation.

As used herein, the term "data" is a broad term and is to be given its ordinary and customary meaning to a person of ordinary skill in the art, and refers without limitation to any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

As used herein, the terms "memory" and "memory device" are broad terms and are to be given their ordinary and customary meaning to a person of ordinary skill in the art, and refer without limitation to computer hardware or circuitry to store information. Memory or memory device can be any suitable type of computer memory or other electronic storage means including, for example, read-only memory (ROM), random access memory (RAM), dynamic RAM (DRAM), static RAM (SRAM), ferroelectric RAM (FRAM), cache memory, compact disc read-only memory (CDROM), electro-optical memory, magneto-optical memory, masked read-only memory (MROM), programmable read-only memory (PROM), erasable programmable read-only memory (EPROM), electrically-erasable programmable read-only memory (EEPROM), rewritable read-only memory, flash memory, or the like. Memory or memory device can be implemented as an internal storage medium and/or as an external storage medium. For example, memory or memory device can include hard disk drives (HDDs), solid-state drives (SSDs), optical disk drives, plug-in modules, memory cards (e.g., xD, SD, miniSD, microSD, MMC, etc.), flash drives, thumb drives, jump drives, pen drives, USB drives, zip drives, a computer readable medium, or the like.

As used herein, the term "network" is a broad term and is to be given its ordinary and customary meaning to a person of ordinary skill in the art, and refers without limitation to any communication network including, for example, an extranet, intranet, inter-net, the Internet, local area network (LAN), wide area network (WAN), metropolitan area network (MAN), wireless local area network (WLAN), ad hoc network, wireless ad hoc network (WANET), mobile ad hoc network (MANET), or the like.

As used herein, the term "processor" is a broad term and is to be given its ordinary and customary meaning to a person of ordinary skill in the art, and refers without limitation to processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, microprocessors, microcontrollers, programmable devices and systems, field-programmable gate arrays (FPGA), application-specific integrated circuits (ASIC), systems on a chip (SoC), systems comprising discrete elements and/or circuits, state machines, virtual machines, data processors, processing facilities, digital signal processing (DSP) processors, and combinations of any of the foregoing. A processor can be coupled to, or integrated with, memory or a memory device.

Figure 1:
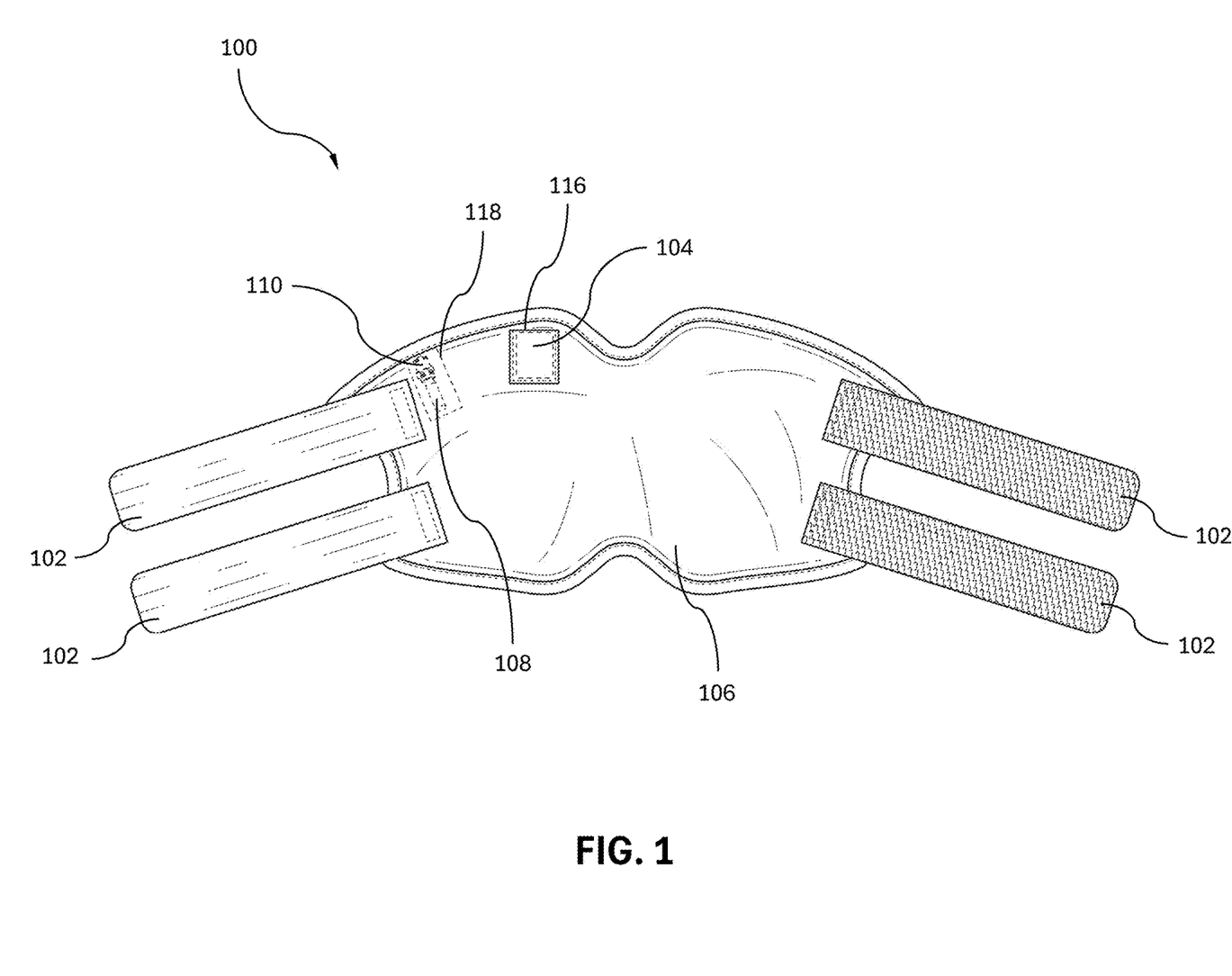
FIG. 1 is a front view of a smart knee brace in an open configuration, according to embodiments.

FIG. 1 is a front view of a smart knee brace 100 in an open configuration, according to embodiments. The smart knee brace 100 can include at least one securing member 102. The securing member 102 can comprise a hook and loop material that wraps around the leg of a user, thereby securing the smart knee brace 100 over the patella (i.e., knee cap). Additionally or alternatively, the securing member 102 can comprise a sleeve (not shown), fitted to a specific user or fitted generally to users based on size variations or universally fitted, where a user slides the smart knee brace 100 over their foot and moves the smart knee brace 100 into position over the patella. As another example, the securing member 102 can comprise strings that the user ties around their leg so that the smart knee brace 100 can be positioned over the patella. Securing member 102 can comprise other types of securing mechanisms known to persons of ordinary skill in the art.

Further illustrated in FIG. 1, the smart knee brace 100 can include a power source 104 to power electronics in the smart knee brace 100. The power source 104 can comprise a rechargeable battery, such as a lithium-ion battery, a nickel-metal hydride battery, a nickel-cadmium battery, and the like, or a non-rechargeable battery, including a non-rechargeable battery designed for single use. The power source 104 as illustrated in FIG. 1 can be secured or contained in a power source container 116, which in turn can be secured to the smart knee brace 100. The power source container 116 can be secured to the smart knee brace 100 by a material comprising a hook and loop fastener, an adhesive binder such as an epoxy or the like, sewing the power source container 116 to the smart knee brace 100, or the like. The power source container 116 can provide access to its interior, such as with a zipper or an opening (e.g., in a pocket configuration) so that the power source 104 may be accessed.

Further illustrated in FIG. 1, the smart knee brace 100 can include a stiffening component 106. The stiffening component 106 is configured to stabilize a user's knee when it stiffens. The stiffening component 106 can comprise a gas-inflatable chamber that receives a gas, such as oxygen, helium, carbon dioxide, or the like, and expands (i.e., stiffens) to provide support to stabilize a user's knee when a potentially injurious movement is detected as explained in more detail below. Additionally or alternatively, the stiffening component 106 can comprise a material that contracts or shrinks and thereby stiffens in response to an electrical current, such as nitinol. As another example, the stiffening component 106 can comprise a material that stiffens in response to a magnetic field, such as a magnetorheological fluid.

In some of the gas-inflatable chamber embodiments, the stiffening component 106 comprises one chamber or cavity. In some embodiments, the stiffening component 106 comprises a plurality of chambers or cavities that independently stiffen. In some embodiments, the stiffening component 106 comprises a single continuous chamber or cavity that is subdivided into different regions. For example, subdivisions can be created within stiffening component 106 via stitching. In this way, the stiffening component 106 can create separate structural supports while maintaining a continuous pathway for gas to stiffen the stiffening component 106. In embodiments in which stiffening component 106 receives a gas, the subdivided regions can allow pressurized gas to travel through the material into all the subdivided regions. Such a material can include a mesh or porous fabric or textile like material. Alternatively, the subdivided regions of a chamber or cavity can be connected to one another via a hose or tube-like structure, wherein the hose or tube-like structure extends into each of the subdivided regions of the chamber or cavity, and gas flows through the hose or tube-like structure into each of the subdivided regions.

In embodiments in which the stiffening component 106 comprises nitinol, the nitinol may be or may be incorporated into fabric, such as one contiguous piece of fabric. Alternatively, the fabric may be divided into distinct portions, and may be, for example, capable of independent stiffening on a per-portion basis.

In embodiments in which the stiffening component 106 comprises a magnetorheological fluid, the fluid may be contained in one chamber or cavity, or the fluid may be contained in multiple, distinct chambers or cavities. The magnetorheological fluid may be able to flow between chambers or cavities or may be contained in given ones of the chambers or cavities.

Figure 2:
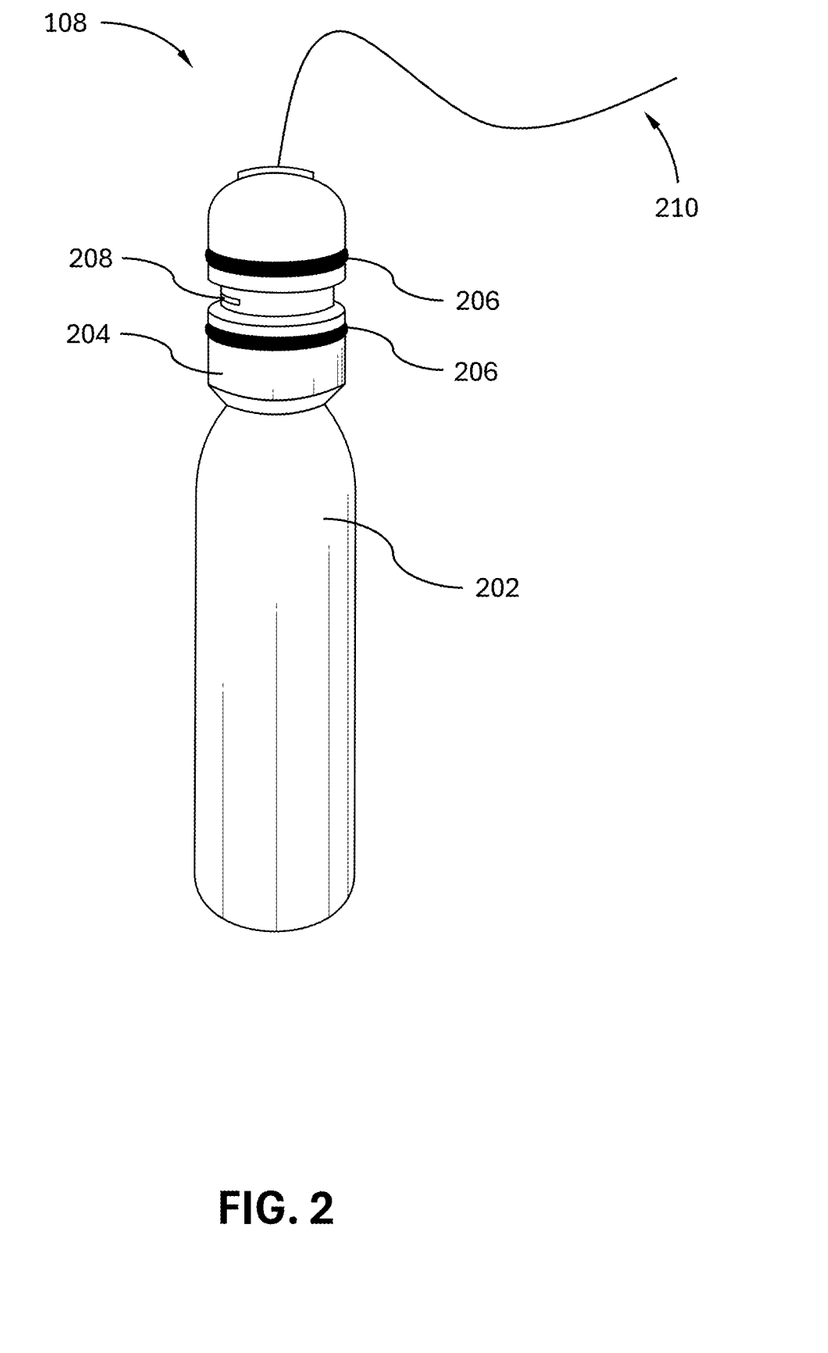
FIG. 2 is a perspective view of an example gas cartridge, according to embodiments.

Further illustrated in FIG. 1, the smart knee brace 100 can include a gas cartridge 108. This is better shown in FIG. 2, which is a perspective view of an example gas cartridge 108. The gas cartridge 108 can contain compressed gas in a canister 202, such as carbon dioxide, oxygen, helium, or the like. A valve 204 can connect to the canister 202 to allow the gas to be expelled. An example valve 204 can include one or more O-rings 206, such as illustrated in FIG. 2, to create an airtight seal with a connector for the smart knee brace 100 as explained below. The valve 204 can further include an outlet 208 from which the compressed gas is expelled. The valve 204 can also include one or more leads 210 that provide an electrical current to cause the gas to expel. For example, in some embodiments, a guanidine nitrate explosive charge is used. In such embodiments, the one or more leads 210 can provide an electrical current that flows through the guanidine nitrate, causing an exothermic reaction, which results in an explosion that melts a seal on the cartridge 108, thereby allowing the compressed gas to flow through the outlet 208.

In some embodiments, the gas cartridge 108 contains a compressed gas that, when decompressed, comprises a volume of gas ranging from about 2 L to 20 L, or any other volume sufficient to inflate the stiffening component 106 to a desired rigidity. For example, in some embodiments, the decompressed gas could have a volume of about 2 to 6 L. In other embodiments, the decompressed gas could have a volume of about 10 to 20 L. Generally, the volume of decompressed gas may depend on the size, shape, and desired rigidity of stiffening component 106.

Figure 3:
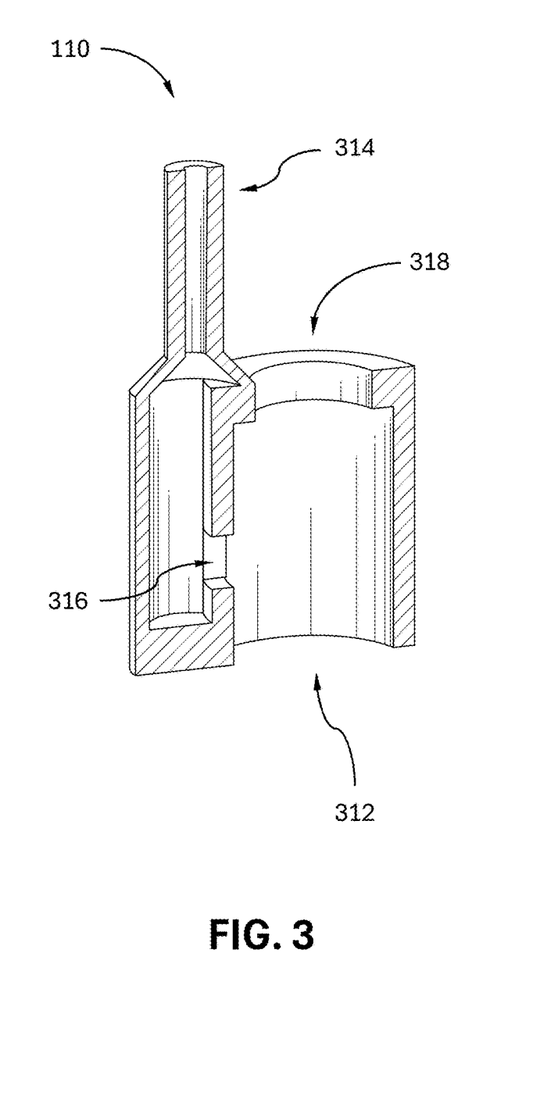
FIG. 3 is a cross-sectional perspective view of the top and front of an example gas connector, according to embodiments.
Figure 4:
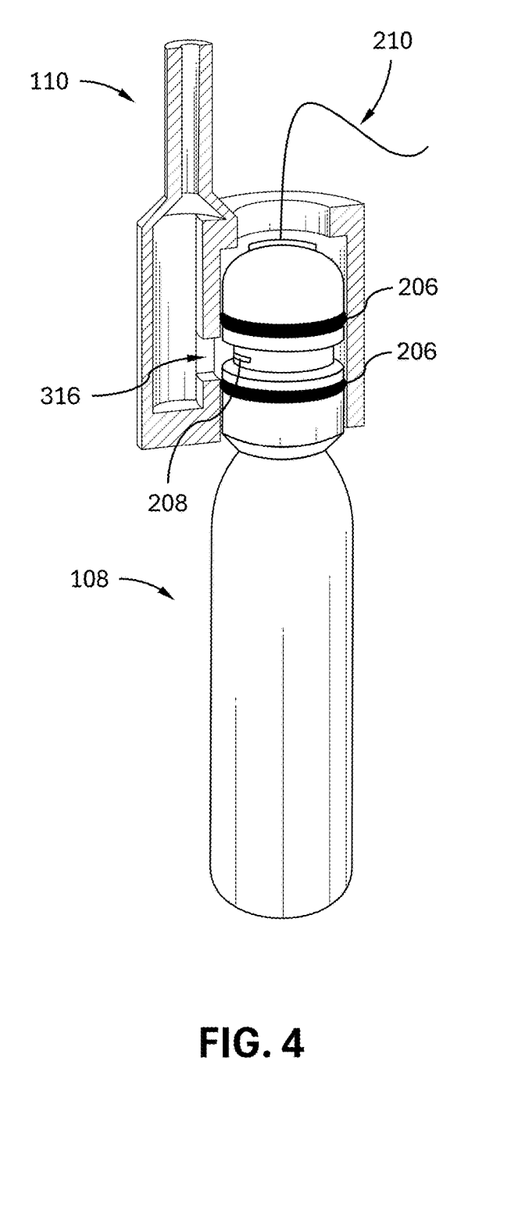

Further illustrated in FIG. 1, the smart knee brace 100 can include a gas connector 110. This is better shown in FIG. 3, which is a cross-sectional perspective view of the top and front of an example gas connector 110. The gas connector 110 fluidly couples the gas cartridge 108 to the stiffening component 106 so that when gas is released from the gas cartridge 108, the gas flows into the stiffening component 106. The gas connector 110 can include a first coupling point 312 and a second coupling point 314. The first coupling point 312 can couple the gas connector 110 to the gas cartridge 108. For example, FIG. 4 is a perspective view of the gas cartridge 108 of FIG. 2 and the gas connector 110 of FIG. 3. As shown in FIG. 4, the gas cartridge 108 can couple to gas connector 110 at the first coupling point 312 via a friction fit. O-rings 206 can provide frictional support and an airtight seal within gas connector 110 so that when gas is expelled from outlet 208, the gas escapes only through pathway 316 of gas connector 110, and out through second coupling point 314. The second coupling point 314 can couple stiffening component 106 to gas connector 110. For example, in some embodiments, stiffening component 106 is connected directly to second coupling point 314. In other embodiments, a tube or hose-like structure can couple to second coupling point 314, which in turn can couple to stiffening component 106. In embodiments where stiffening component 106 does not comprise a gas-inflatable chamber, such as certain embodiments that utilize nitinol only or a magnetorheological fluid only to stiffen component 106, gas cartridge 108 and gas connector 110 may not be implemented.

In some embodiments, gas connector 110 can be a one-way valve in which gas is allowed to flow from the gas cartridge 108 into the stiffening component 106, but not in reverse. In such a fashion, this may mitigate or prevent leakage of gas in the stiffening component 106. In some embodiments, gas connector 110 can comprise a hole with a variable diameter determined via a set screw, for example, proximate to the second coupling point 314, wherein pressure of the gas in the connector 110 can be regulated by the variable diameter of the hole through the set screw. In some embodiments, the gas connector 110 can have a button or a switch that can be pressed to let gas be expelled from the stiffening component 106. Gas connector 110 can further include an aperture 318 through which the one or more leads 210 can be routed to the electronics as explained in more detail below.

Returning to FIG. 1, the gas cartridge 108 and the gas connector 110 can be secured in a gas component container 118, which can be further secured to the smart knee brace 100. The gas component container 118 can be secured to the smart knee brace 100 by a hook and loop fastener, an adhesive binder such as an epoxy, or the like, by sewing the gas component container 118 to the smart knee brace 100, or the like. The gas component container 118 can provide access to its interior, such as with a zipper or an opening (e.g., in a pocket configuration) so that the gas cartridge 108 and/or gas connector 110 can be accessed. For example, when the smart knee brace 100 is activated and gas expels from cartridge 108 (as explained below), the cartridge 108 may need to be replaced for additional use of the knee brace 100. Thus, providing access to the interior of gas component container 118 may allow the user to replace the gas cartridge 108 to continue using the smart knee brace 100.

Figure 5:
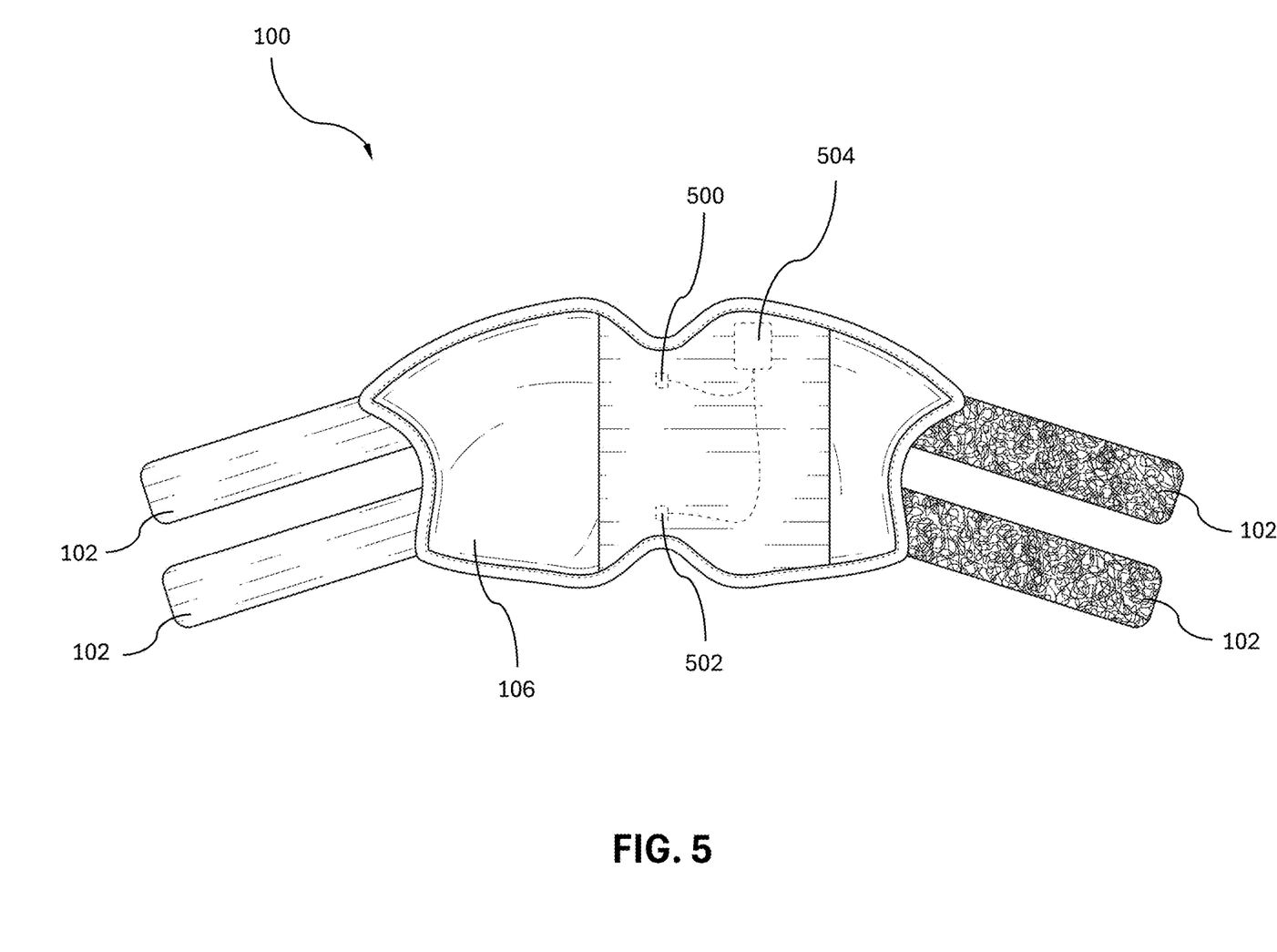
FIG. 5 is a rear view of the smart knee brace shown in FIG. 1, according to embodiments.

FIG. 5 is a rear view of the smart knee brace 100 shown in FIG. 1, according to embodiments. The smart knee brace 100 can include a first sensor 500 and a second sensor 502. The first sensor 500 can be positioned on the smart knee brace 100 such that when the smart knee brace 100 is secured around the leg of a user, the first sensor 500 maintains a substantially constant positional relationship with respect to a location on the user's femur. Similarly, the second sensor 502 can be positioned on the smart knee brace 100 such that when the smart knee brace 100 is secured around the leg of a user, the second sensor 502 maintains a substantially constant positional relationship with respect to a location on the user's tibia. The first sensor 500 can include a plurality of sensors, such as a plurality of like sensors. The second sensor 502 can include a plurality of sensors, such as a plurality of like sensors.

For example, the first sensor 500 and the second sensor 502 can each comprise one or more inertial measurement units ("IMUs") or equivalents thereof. An IMU uses microelectromechanical system ("MEMS") technology to measure quantities such as acceleration, angular velocity, and magnetic flux. In general, the output of an IMU is time-series data, where the data can include data points for each of the x, y, and z directions for each measured quantity. Thus, a 9-axis IMU, for example, will output nine data points at each interval of time corresponding to x, y, z values for each of acceleration, angular velocity, and magnetic flux. Other IMUs may measure fewer quantities, such as acceleration and angular velocity (i.e., 6-axis IMU).

IMU sensors can output digital or analog data. Digital IMU sensors can be advantageous because of low cost and because they output discrete values for each quantity measured. However, the sampling rate of such sensors can be a limitation, particularly if sampling rates for digital IMUs are around 100 Hz. Some studies suggest that an ACL can tear or otherwise be injured within about 30 ms of an injurious impact or movement occurring. Where the sampling rate of a digital IMU sensor is in the 100 Hz range (i.e., 10 ms), the IMU may output x, y, and z data for each of acceleration, angular velocity, and magnetic flux for only three time intervals between the moment an impact occurs and a resulting injury.

To improve the granularity of data, analog IMU sensors can be used. Although the cost of analog IMUs may be higher than digital IMUs, they may provide a greater opportunity to obtain more data in a set amount of time compared to digital IMUs. For example, an analog IMU may operate in the tens of kHz range. The output is typically a voltage corresponding to a value between 0 V and the supply voltage, such as 3 V or 5 V. The voltage level, which is an analog signal, can be sampled and digitized by other electronics, such as an analog-to-digital converter (ADC). For example, in an embodiment that uses a 32-bit ADC, the output voltage for each quantity measured may be digitized to a value between 0 and 232 (i.e., 4,294,967,296). Because an analog IMU does not digitize the measurements internally, they may provide greater flexibility for the circuit designer to select an ADC most appropriate for the smart knee brace 100.

First sensor 500 and/or second sensor 502 can each comprise other types of sensors besides IMUs. For example, each can comprise accelerometers that measure acceleration in the x, y, and/or z direction. Integrating the output of an accelerometer provides velocity, and integrating velocity provides displacement. Thus, first sensor 500 and/or second sensor 502 can comprise one or more accelerometers, the output of which can be integrated twice to determine the measured displacement, which can provide an indication of hyperextension or over-abduction since both result from translational movement.

As another example, first sensor 500 and/or second sensor 502 can each comprise one or more gyroscopes. Gyroscopes measure angular velocity. Thus, one gyroscope can be used to measure angular velocity in the x-y direction, while another gyroscope can be used to measure angular velocity in the z direction. Integrating angular velocity provides angular displacement, which can provide an indication of over-rotation of the tibia with respect to the femur.

First sensor 500 and/or second sensor 502 can comprise a combination of sensors. For example, in some embodiments, first sensor 500 and/or second sensor 502 each comprise one or more IMUs. In some embodiments, first sensor 500 and/or second sensor 502 each comprise one or more accelerometers. In some embodiments, first sensor 500 and/or second sensor 502 each comprise one or more gyroscopes. In some embodiments, first sensor 500 and/or second sensor 502 each comprise one or more accelerometers and one or more gyroscopes.

Still other types of sensors that can be used with smart knee brace 100 include piezoelectric sensors 506 and stress sensors 508 (e.g., thin-film sensors). Piezoelectric sensors 506 can be used to measure pressure or strain at specific points on the knee brace 100. For example, the raw data output from piezoelectric sensors 506 can be converted into pressure values to determine how much force (since pressure is a measure of force per unit area) is being exerted on the femur and tibia and from where, either from external sources of force, or the femur and tibia exerting a force on each other. The measured force can provide an indication as to whether an injurious movement or impact has occurred.

Piezoelectric sensors 506 can be positioned on smart knee brace 100 (not shown in the figures) in locations that correspond to points of interest in the knee's anatomy. For example, a piezoelectric sensor 506 can be positioned on smart knee brace 100 corresponding to where the LCL connects to the femur, while another piezoelectric sensor 506 can be positioned where the LCL connects to the fibula. This pair of piezoelectric sensors 506 can therefore measure pressure or strain on the LCL. Similarly, another pair of piezoelectric sensors 506 can be positioned on smart knee brace 100 to monitor pressure or strain on the MCL. Another pair of piezoelectric sensors 506 can be positioned on smart knee brace 100 to monitor pressure or strain on the ACL, for example, by positioning them above and below the patella in locations corresponding to the femur and tibia, while another pair can be positioned to monitor the PCL, for example, by positioning them behind the knee in locations corresponding to the femur and tibia. Other example points of interest in the knee's anatomy for which piezoelectric sensors 506 can be used to monitor pressure or strain include the quadricep tendon (just above the patella), the patellar ligament (just beneath the patella), and the biceps femoris tendon.

Stress sensors 508, such as thin-film sensors, can be used to measure stress (i.e., force per unit of cross-sectional area) at specific points on the knee brace 100. For example, stress sensors 508 can be positioned on smart knee brace 100 (not shown in the figures) such that they span from the femur to the tibia at specific locations of the knee joint. As with the piezoelectric sensors 506, stress sensors 508 can be used to monitor stress on the LCL, MCL, ACL, and PCL by locating the sensors 508 on the smart knee brace 100 in locations that correspond to these ligaments. Other example points of interest for stress sensors 508 are the quadricep tendon, patellar ligament, and biceps femoris tendon. Generally, the resistance of a stress sensor 508 changes based on stress. By measuring the resistance, the amount of stress at each point of interest can be determined, thereby providing insight as to whether an injurious impact or movement has occurred.

Returning to FIG. 5, the smart knee brace 100 can include a processor 504. The processor 504 can be powered by power source 104 and configured to receive data from the sensors on the knee brace 100 (e.g., first sensor 500, second sensor 502, piezoelectric sensor 506, and/or stress sensor 508). Processor 504 can be in wired or wireless communication with the sensors. For example, in some embodiments, the sensors (e.g., first sensor 500, second sensor 502, piezoelectric sensor 506, and stress sensor 508) utilize radio frequencies to communicate with processor 504, such as RFID/NFC, Bluetooth, or Bluetooth Low Energy.

Electronics in the system, such as processor 504, first sensor 500, second sensor 502, piezoelectric sensor 506, stress sensor 508, and other intermediate or activation circuitry, can be retained in a flexible housing. The flexible housing can be waterproof to prevent damage to the electronics (e.g., from sweat, bumping, jostling, etc.), and can be located anywhere on knee brace 100 such that it does not impede the user's mobility. For example, in some embodiments, the flexible housing can be located on the front of the smart knee brace 100, such as over the patella, or on the outside the user's thigh. The flexible housing can be made from a variety of materials, including silicon, flexible resin, and a thermoplastic polymer. In some embodiments, the stiffening component 106 may be integral with the flexible housing, such as nitinol being woven into or incorporated in the flexible housing.

Figure 6:
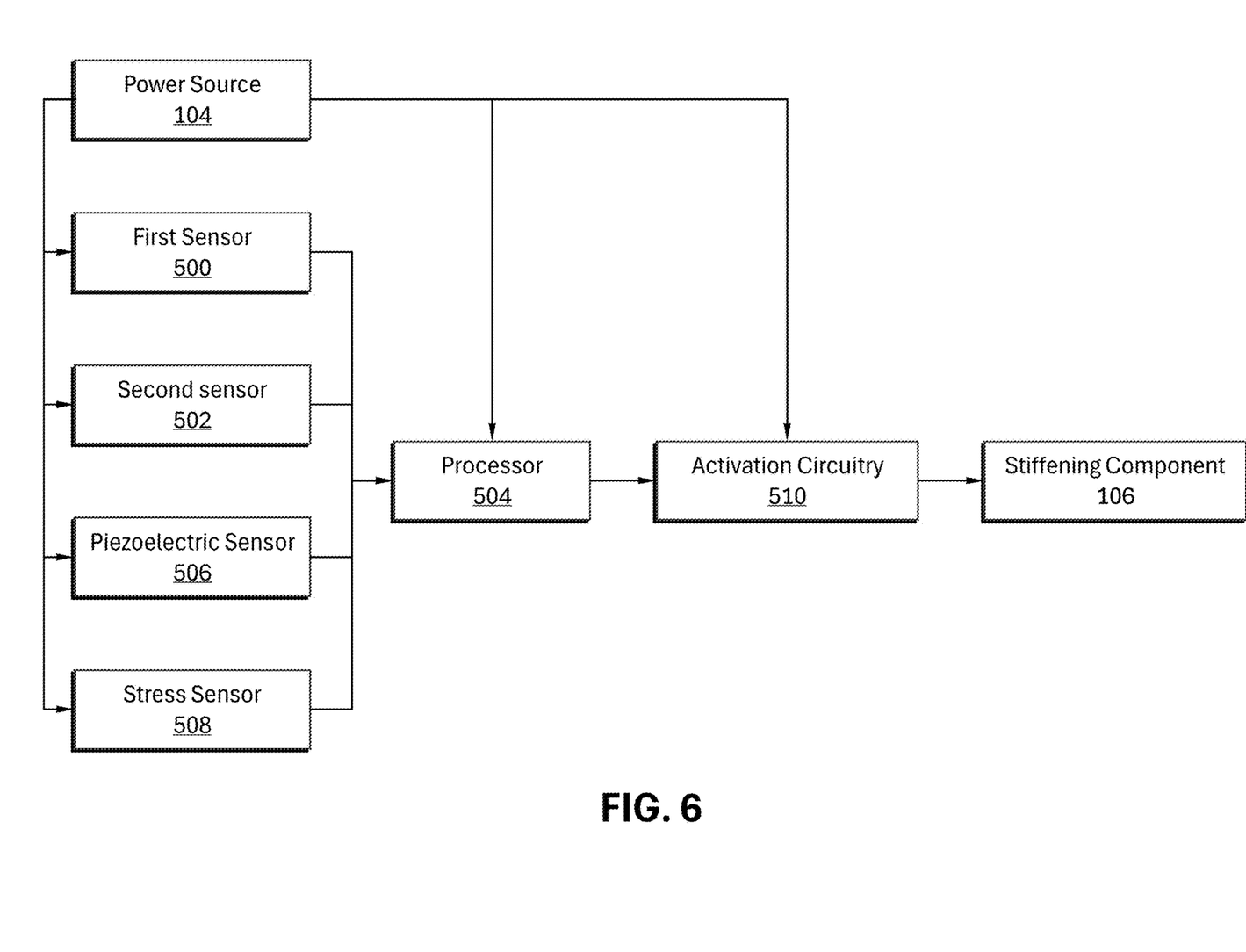
FIG. 6 is a block diagram of electronics for a smart knee brace, according to embodiments.

FIG. 6 is a block diagram of electronics for a smart knee brace 100, according to embodiments. As illustrated, each component can be powered by power source 104. Optionally, one or more of sensors 500, 502, 506, and 508 may be passive sensors (e.g., a type of RFID sensor) that do not require active power. Each of first sensor 500, second sensor 502, piezoelectric sensor 506, and stress sensor 508 can be communicatively coupled to processor 504 (e.g., wired or wirelessly). As explained above, each of first sensor 500, second sensor 502, piezoelectric sensor 506, and stress sensor 508 can comprise one or more sensors, and therefore, the blocks shown in FIG. 5 for each type of sensor may comprise one or a plurality of sensors. Processor 504 can be communicatively coupled to activation circuitry 510. As explained further below, activation circuitry 510 can provide electrical or magnetic energy to activate stiffening component 106. As such, activation circuitry 510 can comprise a high-power BJT, MOSFET, electromagnet, or another suitable circuit element to generate sufficient electrical or magnetic energy. The activation circuitry 510 may cause gas to be expelled from the gas cartridge 108 via gas connector 110 (gas cartridge 108 and connector 110 not shown in FIG. 6) to activate the stiffening component 106.

The electronics of smart knee brace 100 can have a no-power or low-power mode. In such a mode, the components may draw no or substantially little power from power source 104. The smart knee brace 100 can be turned on for use, and therefore the electronics awakened from the no-power or low-power mode, in different ways. In some embodiments, power source 104 can be activated by a user via an activation mechanism (not shown), such as a push button or switch located on the smart knee brace 100. In some embodiments, the smart knee brace 100 can include a motion sensor to wake the electronics and put the device into an operating mode based on detected motion. In some embodiments, the smart knee brace 100 can switch from a low-power mode to an operating mode when the first sensor 500 or second sensor 502 detects substantial movement.

Figure 7:
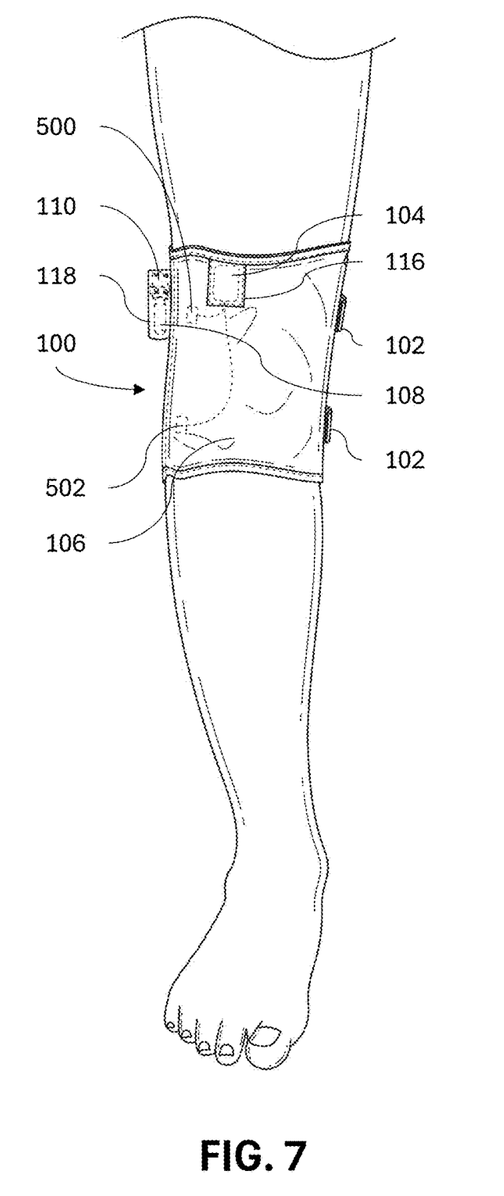
FIG. 7 is a front elevation view of an example smart knee brace positioned on a user's knee, with a stiffening component in an inactive state.

FIG. 7 is a front elevation view of an example smart knee brace 100 positioned on a user's knee, with stiffening component 106 in an inactive state. As illustrated, first sensor 500 can be positioned approximately at a static location with respect to the user's femur, while second sensor 502 can be positioned approximately at a static location with respect to the user's tibia. Each sensor 500 and 502 can generate time-series data relating to their relative positions in free space (e.g., 3-dimensional data), which data can be transmitted to processor 504. Additionally, data from one or more piezoelectric sensors 506 and one or more stress sensors 508 can be transmitted to processor 504. Processor 504 can include memory (or be coupled to memory) that stores instructions that, when executed by processor 504, cause processor 504 to compare the data generated by each of the sensors to detect a displacement, rotation, pressure, and/or strain indicative of a potentially injurious movement or impact (e.g., over-rotation, over-abduction, or hyperextension).

For example, first sensor 500 can serve as a fiducial. By comparing data from the second sensor 502 positioned on the user's tibia to the fiducial sensor 500 positioned on the user's femur, the tibia's absolute position relative to the femur can be calculated by processor 504. More specifically, data generated by each sensor can be used by processor 504 to calculate both translational displacement and rotational displacement of the tibia relative to the femur. When the user engages in non-injurious movements, some amount of translational and rotational displacement is to be expected as the user's leg bends and rotates. However, when the amount of either translational or rotational movement exceeds a threshold, it can be determined that a potential injury may occur. It has been found that, in some cases, a translational force of about 300 N and/or a rotation of about 30° can lead to a knee injury (e.g., ACL injury). The thresholds used to determine whether a potential injury may occur can be based on these values. Other thresholds can also be used. For example, in some embodiments, a hyperextension of about 10°, a valgus rotation of about 7°, and/or a tibial internal/external rotation of about 15° can be used as thresholds for determining whether an injurious movement has occurred based on data from any of the various types of sensors, including first sensor 500, second sensor 502, piezoelectric sensor 506, and/or stress sensor 508. Multiple different thresholds may be assessed. For example, data from any of the various types of sensors can be compared to a first threshold corresponding to potential over-rotation, to a second threshold corresponding to potential over-abduction, and/or a third threshold corresponding to potential hyperextension. Alternatively, second sensor 502 can be used as a fiducial, or there can be a separate fiducial (not shown) in the smart knee brace 100, to which relative positions of the first sensor 500 and/or second sensor 502 are determined.

When processor 504 detects that a threshold has been exceeded, processor 504 can send a trigger signal to activation circuitry 510. In some embodiments, the trigger signal is amplified to a current great enough to activate stiffening component 106. In embodiments that utilize gas to activate stiffening component 106, for example, the output from activation circuity 510 (e.g., electrical current of about 1.2 A) can cause cartridge 108 to rapidly expel gas through pathway 318 of gas connector 110 to second coupling point 314 and into stiffening component 106 (e.g., directly or via a hose or tube-like structure). In embodiments that utilize nitinol in the stiffening component 106, the output from activation circuitry 510 can be an electrical current sufficient to cause the nitinol to shrink and stiffen around the user's knee. In embodiments that utilize a magnetorheological fluid in the stiffening component 106, the activation circuitry 510 may include an electromagnet, and the magnetic field emitted from the electromagnet causes the magnetorheological fluid to stiffen.

Some embodiments of the smart knee brace 100 can utilize a combination of gas, nitinol, and/or magnetorheological fluids. For example, in some embodiments, stiffening component 106 comprises a gas-inflatable chamber that receives a gas, while also having nitinol included around all or a portion of stiffening component 106 (e.g., in a separate liner, woven into the material, etc.). In such embodiments, the output from activation circuitry 510 can include an electrical current sufficient to cause the gas to expel, as well as an electrical current sufficient to activate the nitinol and cause it to shrink. In some embodiments, the nitinol technique is replaced with the magnetorheological fluid technique. In these embodiments, the output from activation circuitry 510 can include both an electrical current to expel the gas and a magnetic field to activate the fluid. For example, activation circuitry 510 can include an electromagnetic positioned proximate to the magnetorheological fluid that generates a magnetic field that passes through the fluid. The magnetic field changes (e.g., increases) the viscosity of the fluid, thereby stiffening the smart knee brace 100 to help prevent an injury.

Figure 8:
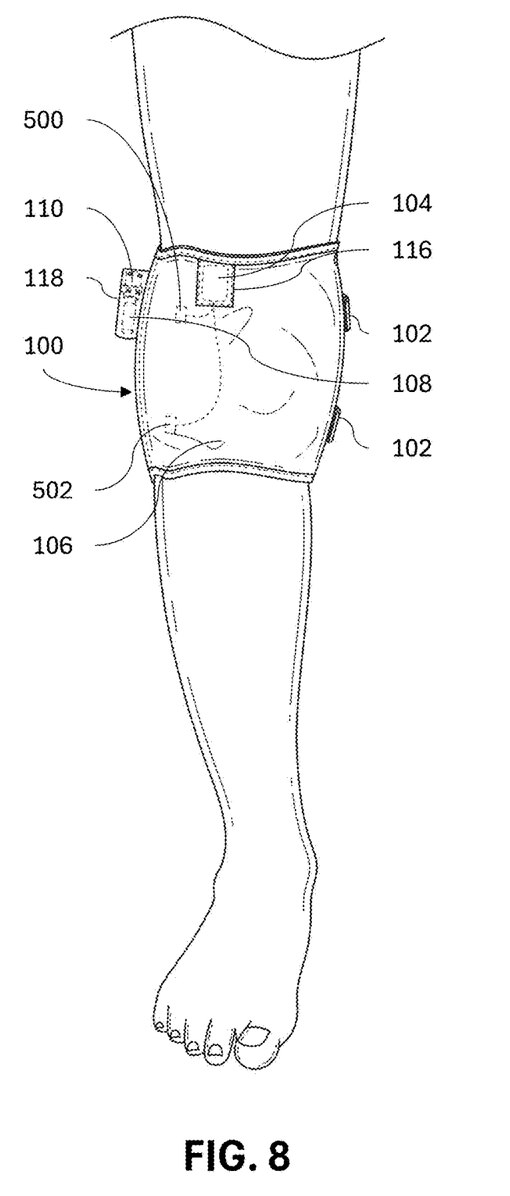
FIG. 8 is a front elevation view of an example smart knee brace positioned on a user's knee, with a stiffening component in an activated state.

In each embodiment, stiffening component 106 can be activated in about 30 ms or less, and can prevent or mitigate injury to the user's knee by exerting a force on the knee to counteract the injurious movement. That is, once activated, component 106 stiffens and constricts around the user's knee, thereby mitigating or stopping the displacement of the tibia with respect to the femur. This is illustrated in FIG. 8, which is a front elevation view of an example smart knee brace 100 positioned on the user's knee, with stiffening component 106 in an activated state.

As noted above, nitinol is activated (i.e., shrinks) under the influence of an electrical current. The current can cause the temperature of the nitinol to reach a high temperature, such as about 200 to 250 degrees Celsius. To mitigate the effect of high temperature on the user's skin, the nitinol can be contained within an insulating material. For example, the insulating material may comprise aramid fibers, such as Kevlar® or Nomex®, or comprise a porous material such as one based on aerogel or carbon.

One phenomenon that can impact the data generated by the first sensor 500 and second sensor 502 and/or the processing of that data is drift. For example, in embodiments where first sensor 500 and second sensor 502 are each an IMU, the data generated will be time-series data indicating the relative position of each IMU in free space. As is typical with electronics, the amount of time measured by each IMU may not be identical and can cause the data generated by multiple IMUs to be unsynchronized. This phenomenon is known as drift, and it can be caused by several factors, such as temperature variations, imperfections in electronics, propagation delays, and stress and strain on the IMU packaging. Drift, and the unsynchronized nature of the data, can present a challenge for processor 504 to determine when a potentially injurious movement has occurred. Compounding the difficulty is that the amount of drift between the sensors' timing may not be constant.

Figure 9:
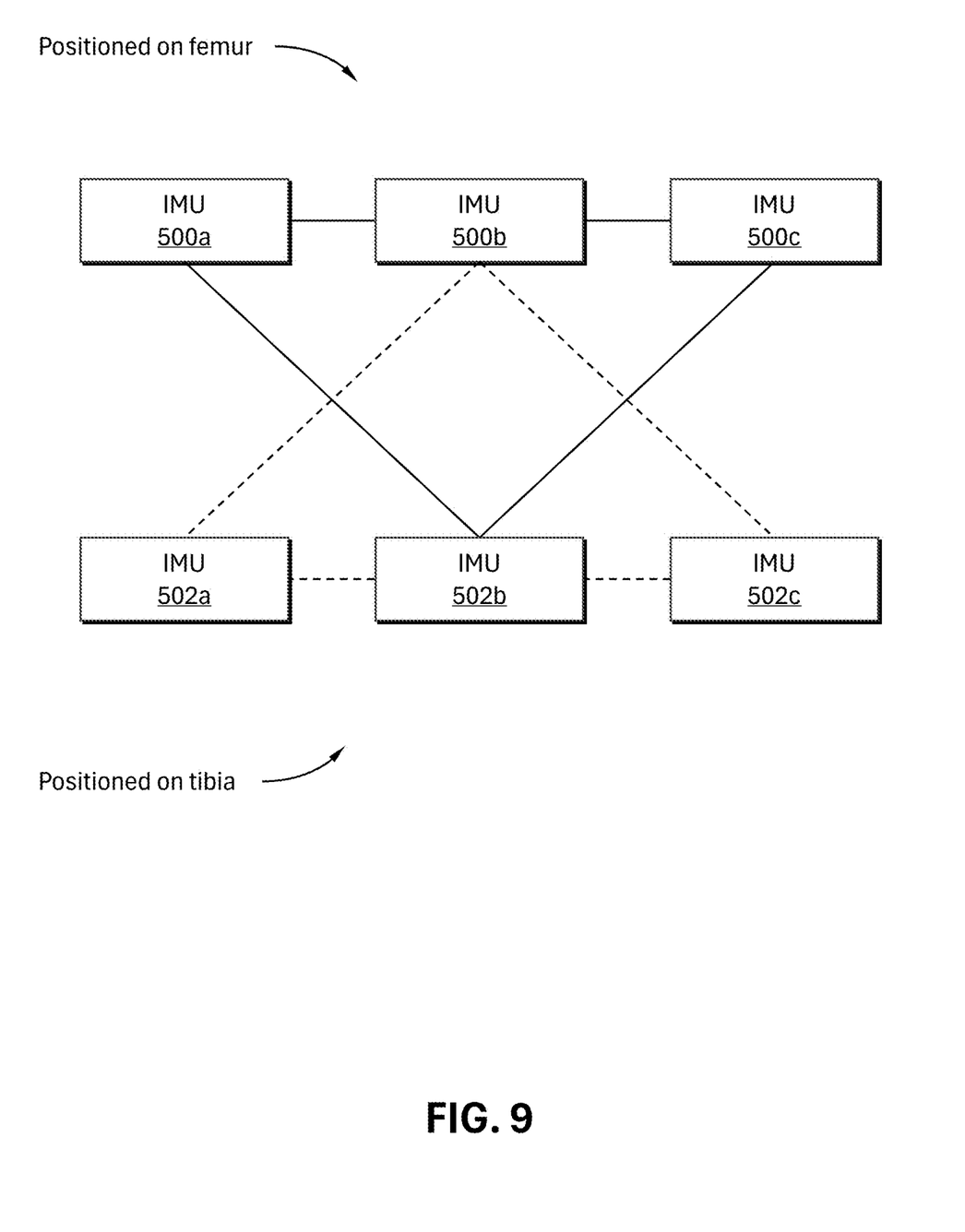
FIGS. 9 and 10 are block diagrams of an example sensor configuration to help mitigate drift.

One way to mitigate drift is to use multiple IMUs in each of the first sensor 500 and the second sensor 502. For example, FIG. 9 is a block diagram of six IMUs in a configuration to help mitigate drift. As illustrated, there are three first sensors 500, labeled 500a, 500b, and 500c, and three second sensors 502, labeled 502a, 502b, and 502c. Sensors 500a, 500b, and 500c can be positioned approximately near the bottom of the femur, while sensors 502a, 502b, and 502c can be positioned approximately near the top of the tibia. The sensors can be grouped into sets of three, as indicated by solid and dashed lines in FIG. 9. That is, sensors 500a, 500c, and 502b can form a first set of sensors (solid line), whereas sensors 502a, 502c, and 500b can form a second set of sensors (dashed line). By positioning the sensors in such a configuration, processor 504 can receive additional data about the position of each sensor's relative position to help determine whether a potentially injurious movement is detected.

Figure 10:
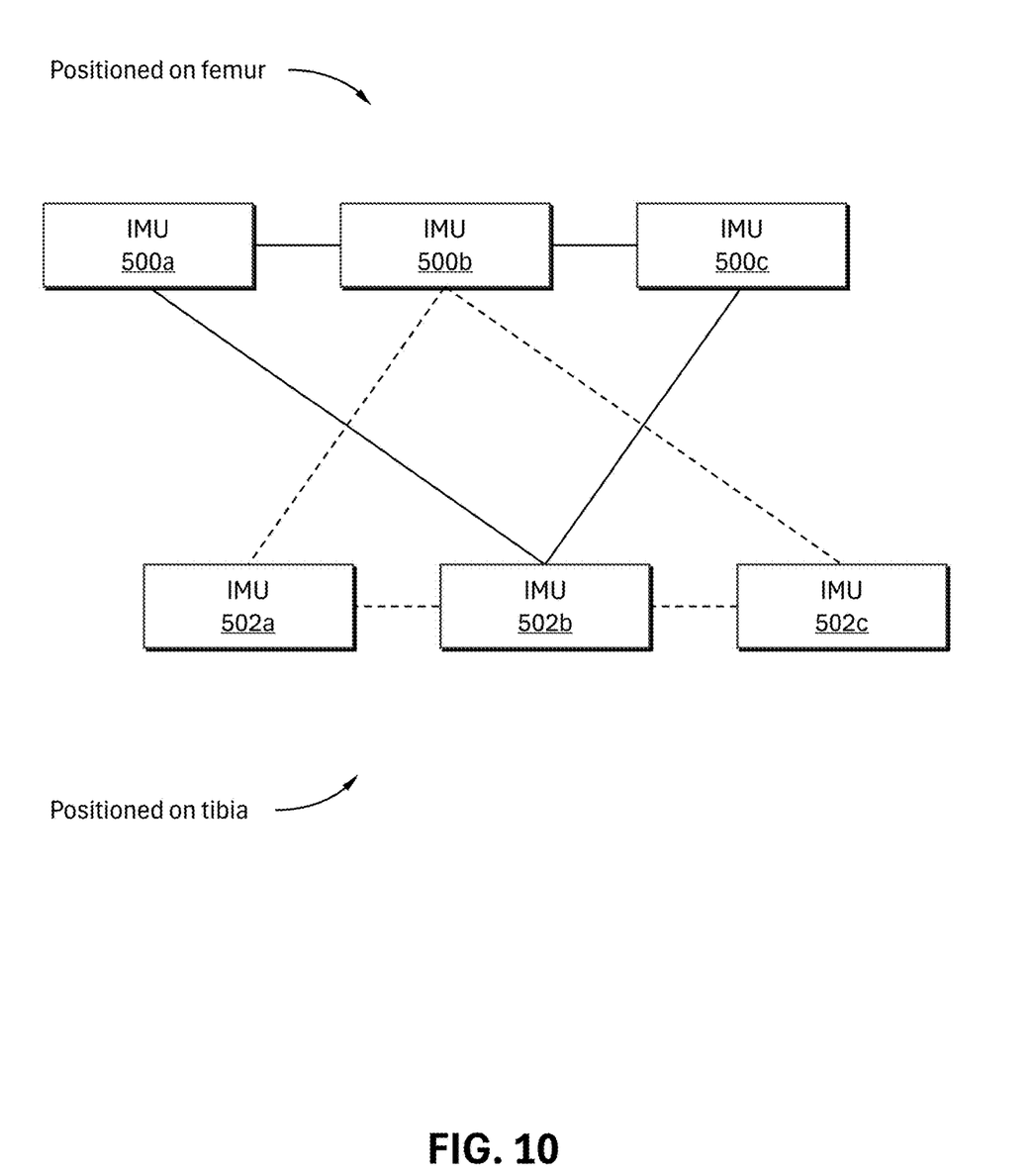

For example, the position of sensor 500b can be measured against the position of 502a and 502c, while the positions of sensors 502a and 502c can be measured against one another. Similarly, the position of sensor 502b can be measured against the position of 500a and 500c, while the positions of sensors 500a and 500c can be measured against one another. With such a configuration, movements in different dimensions can be detected with more granularity than with a configuration in which two sensors are used. If the user's tibia over-rotates or over-translates with respect to the femur, that movement will cause the triangular arrangements of the sensor sets to skew. For example, suppose the user's tibia translates to the right with respect to the femur. Sensors 502a, 502b, and 502c will correspondingly move to the right, thereby changing their alignment with sensors 500a, 500b, and 500c. This is illustrated in FIG. 10, which is a block diagram of the six IMUs from FIG. 9 after a potentially injurious movement has occurred. As illustrated in FIG. 10, the distance between sensors 500a and 502b has increased, while the distance between sensors 500c and 502b has decreased. Likewise, the distance between sensors 502a and 500b has decreased, while the distance between sensors 502c and 500b has increased. Thus, with this configuration, processor 504 can measure at least four separate positional reference points to detect when an injury occurs. The configuration illustrated in FIGS. 9 and 10, and the distances examined with regard to FIG. 10, are illustrative only. Other configurations can be used, and other distances can be examined to mitigate the effects of drift.

Another way to mitigate the effects of drift is to utilize magnetic pulses to synchronize the data, i.e., determine which data points were generated at about the same point in time. For example, each of first sensor 500 and second sensor 502 can include (or be located proximate to) one or more electromagnets. The electromagnets can be used to pulse a magnetic field at a known frequency, which an IMU and/or a magnetic sensor, such as a hall sensor, can subsequently measure along with the positional data. Because the pulses occur at a known frequency and will be generally subject to the same drift that affects the positional data (i.e., subject to the same causes of drift), the pulses can be used as reference points in time for the positional data, which the processor 504 can use to synchronize the data from different IMUs. For example, each IMU can generate positional data (e.g., x, y, z data relating to acceleration, angular velocity, and/or magnetic flux) and magnetic pulses. The same IMU that generates the pulses (or a magnetic sensor located proximate to the IMU) can also detect and count the pulses.

Data indicative of the pulses detected, along with the positional data, can be transmitted to the processor 504 for analysis.

Different configurations are possible for generating the magnetic pulses. For example, in some embodiments, each IMU includes an electromagnet. In some embodiments, each IMU is mounted on a PCB and an electromagnet is located proximate to the IMU. In some embodiments, each IMU and an electromagnet are mounted on a PCB. In some embodiments, each IMU is mounted on a multi-layer PCB, where one or more layers contains a coil of wire, and where the coils collectively create an electromagnet. As an example, a multi-layer PCB can be used, where the IMU and/or a first coil is mounted on one layer, and additional coils are mounted on additional layers of the PCB in such a manner that their magnetic flux combines to create a magnetic field. In each configuration, the electromagnet can create pulses according to methods familiar to those of skill in the art, such as by driving the electromagnet with a pulse train, switching electric current on and off by other means, modulating electric current, and so forth.

Different configurations are possible for detecting the magnetic pulses and generating data indicative of the pulses in response. For example, in some embodiments, each IMU includes a magnetic sensor (e.g., hall sensor), and the IMU detects the magnetic pulses and outputs data indicative of the pulses in response to the detection. In some embodiments, a magnetic sensor is located proximate to the electromagnet, detects the magnetic pulses, and outputs data indicative of the pulses in response to the detection. In some embodiments, an electromagnet and a magnetic sensor are mounted on a PCB (single or multi-layer), the magnetic sensor detects the magnetic pulses generated by the electromagnet, and outputs data indicative of the magnetic pulses in response to the detection. In each configuration, power source 104 can provide power for the electromagnet and/or magnetic sensor, and the data indicative of the magnetic pulses can be transmitted to processor 504.

One advantage to using electromagnets to mitigate the effects of drift is that the data from two IMUs can be synchronized without the need for additional IMUs to generate additional positional data. Moreover, the electromagnets are not limited to synchronizing only data from IMUs. Rather, each of the first sensor 500 and second sensor 502 can comprise accelerometers and/or gyroscopes as explained above. The data from these sensors can be synchronized using magnetic pulses as described above. Similarly, data from piezoelectric sensors 506 and stress sensors 508 can be synchronized by using magnetic pulses as described above.

Additionally, the techniques described above for mitigating drift can be combined. For example, in the configuration shown in FIGS. 9 and 10, each IMU can generate and detect magnetic pulse data and transmit that data to processor 504. Processor 504 can utilize the pulses to establish reference points in time, as well as the robust positional data generated by the sensors, to determine whether one or more thresholds have been exceeded.

In some embodiments, machine learning models can be trained and inferenced to determine whether to activate stiffening component 106. Such models can be used in place of or in addition to the threshold-type approaches discussed above. For example, processor 504 can include instructions for one or more machine learning models. Processor 504 can inference a trained machine learning model using the data obtained from first sensor 500 and second sensor 502. Additionally or alternatively, data from piezoelectric sensor 506 and/or stress sensor 508 can be used to inference a trained machine learning model. One advantage to using machine learning models, particularly where accelerometers and/or gyroscopes are used as the first sensor 500 and/or second sensor 502, is that the raw data generated by these sensors can be input to the machine learning model, obviating the need to convert the data into displacements (e.g., by integrating), thereby increasing the processing speed to detect a potentially injurious movement.

In some embodiments, the machine learning model may comprise a neural network, such as a Recurrent Neural Network (RNN), a Long Short-Term Memory (LSTM) neural network, or a Transformer model. In some embodiments, the machine learning model may comprise decision tree algorithms, such as Random Forest or XGBoost. In some embodiments, the machine learning model may comprise hidden Markov models. In some embodiments, the machine learning model may comprise reinforcement learning-based models, such as a Deep Q-Network (DQN) or an AlphaGo architecture.

Processor 504 can determine whether to activate the stiffening component 106 based on the output of the machine learning model. The machine learning model may be stored on a chip with processor 504, or be coextensive with processor 504. In some embodiments, the machine learning model may be trained by supervised learning, which can involve using labeled data from non-injury measurements from users. In some embodiments, the machine learning model may be trained by unsupervised learning, which can involve using simulated injury data sets and injury data from robotic configurations. In some embodiments, the machine learning model may be trained by reinforcement learning, which can be used in combination with supervised learning. In some embodiments, the machine learning model may be trained by a hybrid approach of supervised and unsupervised learning. The training data can include the raw sensor values from each sensor on the smart knee brace 100. The raw sensor values can have labels corresponding to the ground truth: whether they are from an injurious motion or a non-injurious motion. Impactful features can be identified in different ways, including sequential forward selection (SFS), variance thresholds, mean absolute differences, chi square tests, and fisher's score.

The machine learning model can be implemented into the smart knee brace 100 using C code closely manipulating the hardware through a hardware abstraction layer. In some embodiments, the implementation can be done by manual implementation, which can involve extracting weights and biases from trained models and hardcoding them into efficient matrix operations in C. In some embodiments, the implementation can be done by TinyML frameworks, which can involve using TensorFlow Lite for Microcontrollers and CMSIS-NN for optimized inference on embedded platforms. In some embodiments, the implementation can be done by fixed-point arithmetic and hardware acceleration, which can involve reducing computational overhead to improve real-time performance. For example, in some embodiments, weights and biases can be hard coded directly into hardware logic circuits, such as an FPGA, to perform the arithmetic calculations simultaneously rather than sequentially.

The machine learning model may be further trained after being deployed on the smart knee brace 100. The model may be further trained based on sensor data obtained during use of the smart knee brace 100. Such ongoing training may be accomplished by immediate training or long-term training.

Immediate training can involve asking the user to conduct specific motions to provide labeled data for calibration and to use that calibration as a reference. Long-term training can involve keeping a record of the data measured by the sensors and the output of the deployed model to track the error rate and use the collected data to further refine the machine leaning model.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. Further, the sequence of steps for example methods described or illustrated herein are not to be construed as necessarily requiring their performance in the particular order described or illustrated unless specifically identified as requiring so or clearly identified through context. Moreover, example methods may omit one or more steps described or illustrated, or may include additional steps in addition to those described or illustrated. Thus, one of ordinary skill in the art, using the disclosures provided herein, will appreciate that various steps of example methods can be omitted, rearranged, combined, and/or adapted in various ways without departing from the spirit and scope of the inventions.

What is claimed is:

1. A knee brace for preventing or mitigating injury to a user's knee, comprising:
    a first sensor configured to be positioned to maintain a substantially constant positional relationship with respect to a location on a femur;
    a second sensor configured to be positioned to maintain a substantially constant positional relationship with respect to a location on a tibia;
    a stiffening component configured to stabilize the user's knee; and
    a processor configured to receive sensor data from the first sensor and the second sensor and to determine a relative position between the location on the femur and the location on the tibia based at least in part on the sensor data,
    wherein the processor is configured to activate the stiffening component when the relative position exceeds at least one of a first threshold, a second threshold, or a third threshold,
    wherein the processor is configured to evaluate the relative position to each of the first threshold, the second threshold, and the third threshold,
    wherein the first threshold indicates a potential over-rotation of the tibia with respect to the femur, wherein the second threshold indicates a potential over-abduction of the tibia with respect to the femur, and wherein the third threshold indicates a potential hyperextension of the tibia with respect to the femur, and
    wherein the first sensor includes a first plurality of sensors and the second sensor includes a second plurality of sensors, wherein an arrangement of the first plurality of sensors and the second plurality of sensors is configured to reduce an effect of drift among the sensor data.

2. The knee brace of claim 1, wherein each of the first sensor and the second sensor comprises a respective inertial measurement unit.

3. The knee brace of claim 2, further comprising:
    a first electromagnet configured to generate one or more first magnetic pulses;
    a first magnetic sensor located proximate to the first electromagnet, wherein the first magnetic sensor is configured to detect the one or more first magnetic pulses and to generate data indicative of the one or more first magnetic pulses in response to the detection;
    a second electromagnet configured to generate one or more second magnetic pulses; and
    a second magnetic sensor located proximate to the second electromagnet, wherein the second magnetic sensor is configured to detect the one or more second magnetic pulses and to generate data indicative of the one or more second magnetic pulses in response to the detection;
    wherein the data indicative of the one or more first magnetic pulses and the data indicative of the one or more second magnetic pulses is received by the processor, and
    wherein the processor utilizes the data indicative of the one or more first magnetic pulses and the data indicative of the one or more second magnetic pulses to synchronize the sensor data from the first sensor and the second sensor.

4. The knee brace of claim 1, wherein the stiffening component comprises a gas-inflatable chamber.

5. The knee brace of claim 4, wherein, when the processor activates the stiffening component, a gas is injected into the gas inflatable chamber via a gas cartridge.

6. The knee brace of claim 1, wherein the sensor data from each of the first sensor and the second sensor comprises data relating to acceleration and angular velocity in three dimensions.

7. The knee brace of claim 1, wherein the first sensor, the second sensor, and the processor are retained in a flexible housing.

8. The knee brace of claim 1, further comprising at least one piezoelectric sensor, wherein the processor is further configured to receive data from the at least one piezoelectric sensor to determine whether to activate the stiffening component.

9. The knee brace of claim 1, further comprising at last one stress sensor, wherein the processor is further configured to receive data from the at least one stress sensor to determine whether to activate the stiffening component.

10. The knee brace of claim 1, wherein, to reduce the effect of drift, the processor is configured to determine a position of one of the first plurality of sensors with respect to two of the second plurality of sensors, wherein the processor is further configured to determine a position of the two of the second plurality of sensors with respect to each other.

11. The knee brace of claim 10, wherein, to reduce the effect of drift, the processor is configured to determine a position of one of the second plurality of sensors with respect to two of the first plurality of sensors, wherein the processor is further configured to determine a position of the two of the first plurality of sensors with respect to each other.

12. The knee brace of claim 1, wherein, to reduce the effect of drift, the processor is configured to determine a position of one of the second plurality of sensors with respect to two of the first plurality of sensors, wherein the processor is further configured to determine a position of the two of the first plurality of sensors with respect to each other.

13. A knee brace for preventing or mitigating injury to a user's knee, comprising:
    a first sensor configured to be positioned to maintain a substantially constant positional relationship with respect to a location on a femur;

a second sensor configured to be positioned to maintain a substantially constant positional relationship with respect to a location on a tibia;
a stiffening component configured to stabilize the user's knee; and
a processor configured to receive sensor data from the first sensor and the second sensor, wherein the processor is configured to inference a machine learning model to determine whether to activate the stiffening component based at least in part on the sensor data received from the first sensor and the second sensor,
wherein the first sensor includes a first plurality of sensors and the second sensor includes a second plurality of sensors, wherein an arrangement of the first plurality of sensors and the second plurality of sensors is configured to reduce an effect of drift among the sensor data.

14. The knee brace of claim 13, wherein each of the first sensor and the second sensor comprises a respective inertial measurement unit.

15. The knee brace of claim 14, further comprising:
a first electromagnet configured to generate one or more first magnetic pulses;
a first magnetic sensor located proximate to the first electromagnet, wherein the first magnetic sensor is configured to detect the one or more first magnetic pulses and to generate data indicative of the one or more first magnetic pulses in response to the detection;
a second electromagnet configured to generate one or more second magnetic pulses; and
a second magnetic sensor located proximate to the second electromagnet, wherein the second magnetic sensor is configured to detect the one or more second magnetic pulses and to generate data indicative of the one or more second magnetic pulses in response to the detection;
wherein the data indicative of the one or more first magnetic pulses and the data indicative of the one or more second magnetic pulses is received by the processor, and
wherein the machine learning model utilizes the data indicative of the one or more first magnetic pulses and the data indicative of the one or more second magnetic pulses in determining whether to activate the stiffening component.

16. The knee brace of claim 13, wherein the stiffening component comprises a gas-inflatable chamber.

17. The knee brace of claim 16, wherein, when the stiffening component is activated, a gas is injected into the gas inflatable chamber via a gas cartridge.

18. A method for preventing or mitigating injury to a user's knee, comprising:
determining a relative position between a location on a femur according to a first sensor and a location on a tibia according to a second sensor;
evaluating the relative position to each one of a first threshold, a second threshold, and a third threshold; and
activating a stiffening component to stabilize the user's knee when the relative position exceeds at least one of the first threshold, the second threshold, or the third threshold,
wherein the first threshold indicates a potential over-rotation of the tibia with respect to the femur, wherein the second threshold indicates a potential over-abduction of the tibia with respect to the femur, and wherein the third threshold indicates a potential hyperextension of the tibia with respect to the femur,
wherein a processor is configured to receive sensor data from the first sensor and the second sensor, wherein the sensor data is indicative of a relative position between the first sensor and the second sensor, and
wherein the first sensor includes a first plurality of sensors and the second sensor includes a second plurality of sensors, wherein an arrangement of the first plurality of sensors and the second plurality of sensors is configured to reduce an effect of drift among the sensor data.

19. The method of claim 18, wherein the determining step, the evaluating step, and the activating step are performed at least partially by the processor.

20. The method of claim 18, wherein the stiffening component comprises a gas-inflatable chamber, and wherein the activating step further comprises injecting gas into the gas-inflatable chamber via a gas cartridge.

* * * * *